US010705351B2

(12) United States Patent
Perrot et al.

(10) Patent No.: US 10,705,351 B2
(45) Date of Patent: Jul. 7, 2020

(54) OPHTHALMIC DEVICE COMPRISING AN OPHTHALMIC SPECTACLE LENS AND A PLURALITY OF ELECTRONIC COMPONENTS

(71) Applicant: Essilor International, Charenton-le-Pont (FR)

(72) Inventors: Stephane Perrot, Charenton (FR); Willy Chaudat, Charenton-le-pont (FR); Jerome Ballet, Charenton (FR); Samuel Archambeau, Charenton-le-pont (FR); Jean-Paul Cano, Charenton (FR); David Escaich, Charenton (FR)

(73) Assignee: Essilor International, Charenton-le-Pont (FR)

( * ) Notice: Subject to any disclaimer, the term of this patent is extended or adjusted under 35 U.S.C. 154(b) by 101 days.

(21) Appl. No.: 16/067,231

(22) PCT Filed: Dec. 27, 2016

(86) PCT No.: PCT/EP2016/082729
§ 371 (c)(1),
(2) Date: Jun. 29, 2018

(87) PCT Pub. No.: WO2017/114842
PCT Pub. Date: Jul. 6, 2017

(65) Prior Publication Data
US 2019/0011729 A1 Jan. 10, 2019

(30) Foreign Application Priority Data
Dec. 30, 2015 (EP) .................................... 15307170

(51) Int. Cl.
G02C 7/08 (2006.01)
G02C 7/10 (2006.01)
G02B 27/01 (2006.01)

(52) U.S. Cl.
CPC ............. *G02C 7/083* (2013.01); *G02C 7/101* (2013.01); *G02B 27/0172* (2013.01); *G02B 2027/0178* (2013.01)

(58) Field of Classification Search
CPC ........ G02C 7/083; G02C 7/101; G02C 11/10; G02B 2027/0178; G02B 27/0172
(Continued)

(56) References Cited

U.S. PATENT DOCUMENTS 9,612,456 B1 * 4/2017 Pugh et al. ............ G02C 11/10
2007/0242173 A1 10/2007 Blum et al.
(Continued)

FOREIGN PATENT DOCUMENTS

CN 101246265 A 8/2008
EP 2063311 A1 5/2009
(Continued)

OTHER PUBLICATIONS

International Search Report dated Apr. 26, 2017, in PCT/EP2016/082729, filed Dec. 27, 2016.

*Primary Examiner* — Tuyen Tra
(74) *Attorney, Agent, or Firm* — Oblon, McClelland, Maier & Neustadt, L.L.P.

(57) ABSTRACT

An ophthalmic spectacle lens and a plurality of electronic components arranged in a form of at least one strip in contact with and along the periphery of the ophthalmic lens. An ophthalmic apparatus includes at least one frame and at least one ophthalmic device.

16 Claims, 1 Drawing Sheet

(58) Field of Classification Search
USPC .................................. 351/41, 159.01, 159.39
See application file for complete search history.

(56) References Cited

U.S. PATENT DOCUMENTS

| | | |
|---|---|---|
| 2012/0249797 A1 | 10/2012 | Haddick et al. |
| 2014/0028966 A1 | 1/2014 | Blum et al. |
| 2017/0031181 A1 | 2/2017 | Blum et al. |
| 2017/0075141 A1 | 3/2017 | Blum et al. |

FOREIGN PATENT DOCUMENTS

| | | |
|---|---|---|
| EP | 2405295 A1 | 1/2012 |
| WO | WO 02/057836 A1 | 7/2002 |
| WO | WO 2012/068527 A2 | 5/2012 |
| WO | WO 2013/188805 A2 | 12/2013 |

* cited by examiner

OPHTHALMIC DEVICE COMPRISING AN OPHTHALMIC SPECTACLE LENS AND A PLURALITY OF ELECTRONIC COMPONENTS

The invention relates to an ophthalmic device comprising an ophthalmic spectacle lens and a plurality of electronic components. It also relates to an ophthalmic apparatus comprising at least one frame and at least one such ophthalmic device.

Ophthalmic apparatuses are known which make it possible to provide ophthalmic spectacle lenses with a functionality or several functionalities in order to contribute to the correction of a wearer's ametropia and/or to the wearer's visual comfort and/or to provide the wearer with complementary functionalities other than relating to the correction of vision or to visual comfort. Among the known functionalities and by nonlimiting way of examples may be cited: variation of the luminous transmission of the ophthalmic lens, variation of the dioptric power of the ophthalmic lens, presentation of information by virtue of the ophthalmic lens.

Routinely, such functionalities may be electro-controlled and one or a plurality of electrical signals are generated so as to modify the state of the functionality of the ophthalmic lens as a function of parameters. Electronic components are in particular arranged on or in an ophthalmic apparatus so as to activate and/or to control a functionality or functionalities of the ophthalmic lens. Routinely, these electronic components are arranged on or in a frame which is able to receive a pair of ophthalmic lenses and also to generate and transmit electrical signals to said ophthalmic lenses.

Such ophthalmic apparatuses require frames of a particular type comprising, beforehand, the electronic components necessary for the activation and/or for the control of the electronic components for a given functionality. However, numerous functionalities can be chosen and this results in a large quantity of frames which must be pre-equipped with said electronic components. Problems with stocks and/or availability of said frames may result therefrom.

The present invention is aimed in particular at solving these problems.

Thus the invention relates to an ophthalmic device which comprises an ophthalmic spectacle lens and a plurality of electronic components arranged in the form of at least one strip in contact with and at the periphery of said ophthalmic lens.

By "strip" is meant an item which is longer than it is wide and of small thickness. According to one embodiment, a strip is long, narrow and flexible. According to one embodiment, a strip can be manipulated and shaped to conform to a given surface. According to another embodiment, a strip is produced directly in contact with the ophthalmic lens. A strip within the sense of the present invention can be open or closed, that is to say that it can have respectively two ends or else form a closed loop.

The arrangement of a plurality of electronic components in the form of a strip in contact with and at the periphery of said ophthalmic lens makes it possible to install electrical components in a manner integral with the lens and thus to limit or to circumvent components arranged in a frame which is intended to receive said ophthalmic lens. Furthermore, the choice of a strip shape is particularly advantageous since it makes it possible to arrange said electrical components in a discreet manner, for example in a zone of the ophthalmic lens which is not liable to hinder the wearer's vision, and it makes it possible to position a significant number of components by distributing them along the length of the strip.

According to various embodiments which can be taken in combination according to all technically achievable variants:
- the ophthalmic lens comprises two main surfaces and an edge linking said two main surfaces, and the electronic components arranged in the form of a strip are disposed at the periphery on the edge of said ophthalmic lens;
- the ophthalmic lens comprises two main surfaces and an edge linking said two main surfaces, and the electronic components arranged in the form of a strip are disposed at the periphery on at least one of the main surfaces of said ophthalmic lens;
- the ophthalmic lens comprises at least one internal surface and the electronic components arranged in the form of a strip are disposed at the periphery on at least one internal surface of said ophthalmic lens;
- the edge of the ophthalmic lens comprises a groove in which the electronic components arranged in the form of a strip are disposed;
- the length of the strip is greater than or equal to 5 times the width of said strip, for example the length of the strip is greater than or equal to 10 times the width of said strip, or indeed for example the length of the strip is greater than or equal to 50 times the width of said strip;
- the length of the strip occupies at least 5% of the periphery of the ophthalmic lens, for example at least 10% of the periphery of the ophthalmic lens;
- at least one strip comprising a plurality of electronic components is intended to be masked by a part of a frame suitable for receiving the ophthalmic device;
- the ophthalmic lens has an electro-controlled functionality activatable in part or entirely by at least one of the electronic components arranged in the form of a strip;
- the ophthalmic lens is an ophthalmic lens with phase variation and/or an ophthalmic lens with amplitude variation and/or an ophthalmic lens comprising at least one electro-controlled layer and/or a smart ophthalmic lens;
- the ophthalmic lens is a lens with amplitude variation of electrochromic ophthalmic lens type which comprises two rigid parts linked together to form a cavity within which is arranged an electrochromic material and the plurality of electronic components arranged in the form of a strip is linked by an equipotential line to at least one of said rigid parts;
- the electronic components arranged in the form of at least one strip are chosen from among passive components, for example a resistive component, a capacitive component and/or active components, for example a diode, a radio component, an imaging device, a battery, a sensor, a motor;
- the electronic components arranged in the form of at least one strip are linked together by at least one conducting wire and/or a conducting track suitable for simultaneously conveying electrical power and at least one signal relating to a piece of data;
- the electronic components arranged in the form of a strip have been deposited directly in contact with the ophthalmic lens;
- the electronic components arranged in the form of a strip have been previously arranged on a support forming a strip and then said support deposited in contact with the ophthalmic lens.

The present invention also envisages an ophthalmic apparatus comprising at least one frame and at least one ophthalmic device mentioned hereinabove.

According to one embodiment, at least one strip comprising a plurality of electronic components is masked by a part of the frame.

The present invention also envisages an ophthalmic apparatus comprising at least one frame and at least one ophthalmic device, which comprises an ophthalmic spectacle lens and a plurality of electronic components arranged in the form of at least one strip in contact with and at the periphery of said ophthalmic lens, where the electronic components arranged in the form of a strip have been previously arranged on a support forming a strip and then said support deposited in contact with the ophthalmic lens and where a part or the totality of the electronic components is masked by the frame.

According to one embodiment, a part or the totality of the electronic components is masked by at least one rim of the frame.

The present invention also envisages a method for producing an ophthalmic device which comprises an ophthalmic spectacle lens and a plurality of electronic components arranged in the form of at least one strip in contact with and at the periphery of said ophthalmic lens, where said method comprises the following steps:
provision of an unedged ophthalmic lens;
provision of an edging contour for the ophthalmic lens;
provision of a flexible strip comprising electronic components arranged on a support;
cutting of the ophthalmic lens according to the edging contour so as to produce an edged ophthalmic lens;
fixing of the flexible strip at the periphery of the edged ophthalmic lens.

Routinely, by "unedged ophthalmic lens" is meant an ophthalmic lens whose dimension is intended to allow suitable fitting in a plurality of frames; an unedged ophthalmic lens is therefore of greater dimension than that of the edged lens whose contour is defined as a function of a chosen frame.

The present invention also envisages a method for producing an ophthalmic apparatus which comprises at least one frame and at least one ophthalmic device, which comprises an ophthalmic spectacle lens and a plurality of electronic components arranged in the form of at least one flexible strip in contact with and at the periphery of said ophthalmic lens, where said method comprises the following steps:
provision of at least one flexible strip;
arrangement of the electronic components on the flexible strip;
provision of at least one unedged ophthalmic lens;
provision of at least one edging contour for said ophthalmic lens;
cutting of at least the ophthalmic lens according to the edging contour so as to produce an edged ophthalmic lens;
fixing of the flexible strip with the electronic components at the periphery of the edged ophthalmic lens
fitting into place in the frame of the ophthalmic device comprising the edged ophthalmic lens and the flexible strip with the electronic components, in such a way that a plurality of electronic components is in part or entirely masked by a part by the frame.

According to one embodiment, a part or the totality of the electronic components is masked by at least one rim of the frame.

Other characteristics and advantages of the present invention will become apparent in the following detailed description, referring to the appended drawings in which.

It should be noted that, in the figures, the structural and/or functional elements common to the various embodiments may exhibit the same references. Thus, unless stated to the contrary, such elements have identical structural, dimensional and material properties. Moreover and in order to facilitate the understanding of the figures, the elements represented are not necessarily to scale. For the sake of clarity, only the elements useful to the understanding of the embodiments described have been represented and will be detailed.

Figure 1:
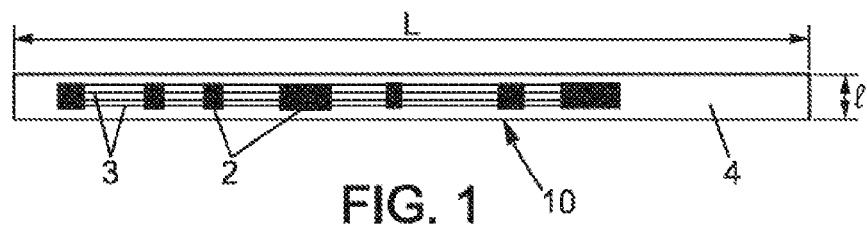
FIG. 1 is a diagram of a strip on which a plurality of electronic components is arranged.

FIG. 1 is a diagram of a strip 10, implemented in the present invention, which comprises a support 4 on which is arranged a plurality of electronic components 2 linked together by electrical wires 3. This strip 10 is open and substantially rectilinear. The length of the strip is denoted L and its width I; according to one embodiment, L/I≥5, for example L/I≥10, or indeed L/I≥50. According to one embodiment the width I is between 1 and 10 mm and the length L is between 5 and 100 mm. According to one embodiment, the thickness of the strip is between 1 mm and 5 mm and the thickness of the support is between 0.005 mm and 1 mm. According to one embodiment, the electronic components 2 have dimensions of between 0.1 mm and 10 mm. According to an exemplary embodiment, between 10 and 100 electronic components are arranged on the strip 10.

Figure 2:
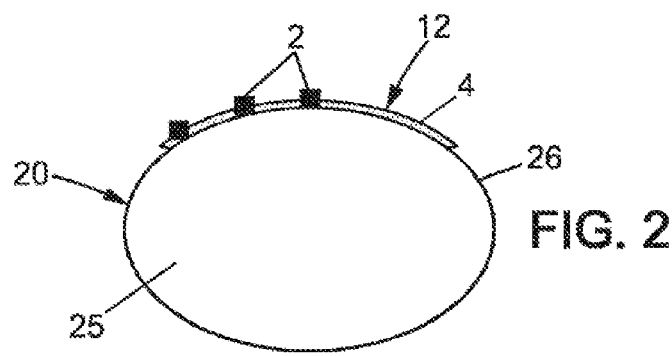
FIG. 2 is a diagram of an ophthalmic device according to the present invention.

FIG. 2 is a diagram of an ophthalmic device 20 according to the present invention which comprises an ophthalmic spectacle lens 25 and a plurality of electronic components 2 arranged in the form of at least one strip 12, for example the strip 10 represented in FIG. 1, on an edge 26 situated at the periphery of said ophthalmic lens. The strip 12 is sufficiently flexible to be able to conform to the shape of the edge 26. The strip 12 can be arranged on a flat edge or a slightly rounded edge of said ophthalmic lens or else be at least partially arranged in a groove machined in the edge 26 of the ophthalmic lens 25.

Figure 3:
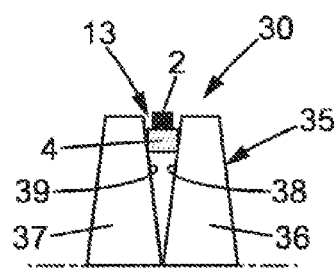
FIG. 3 is a partial diagram of another ophthalmic device according to the present invention.

FIG. 3 is a partial diagram of an ophthalmic device 30 according to the present invention which comprises an ophthalmic spectacle lens 35 comprising two rigid parts 36, 37, usually called shells, arranged opposite one another and a plurality of electronic components 2 arranged in the form of at least one strip 13, for example the strip 10 represented in FIG. 1, in contact with and at the periphery of the ophthalmic lens 35. The two shells 36, 37, represented partially in the present figure, are linked together and disposed in such a way as to form a cavity within which a material is arranged; according to one embodiment, the material is an electrochromic material and at least one of the electronic components 2 generates a signal of such a nature as to activate a colorimetric variation of the electrochromic material. The shells 36, 37 each comprise an internal surface respectively 38, 39 which separate from one another at the periphery of the lens 35. In the embodiment represented, the strip 13 is situated in the space corresponding to this separation in such a way that the strip 13 is flush with the external edge of the ophthalmic lens 35.

The shells 36 and 37 moreover each possess on their internal surfaces 38 and 39 a conducting layer, for example based on ITO (for "Indium Tin Oxide"), making it possible to apply an electric field to the electrochromic material. The strip 10 then possesses zones making it possible to ensure electrical contact between the strip 10 and the conducting layers.

According to one embodiment, a photovoltaic treatment can be present on the surface of the shells 36, 37. The arrangement of the strip 10 can also be used to ensure contact between the photovoltaic treatment on at least one surface of the lens and the strip 10, and thus make it possible to supply the strip 10 with energy. These contacts can for example be ensured by conducting pads present on a bus and the use of a conducting glue.

Figure 4:
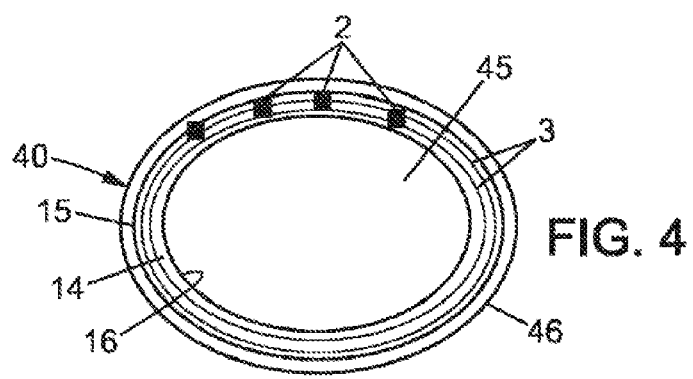
FIG. 4 is a diagram of another ophthalmic device according to the present invention.

FIG. 4 is a diagram of an ophthalmic device 40 according to the present invention which comprises an ophthalmic spectacle lens 45 and a plurality of electronic components 2 arranged in the form of a strip 14 on a surface of the ophthalmic lens 45. Said surface can be a rear surface of the lens, situated on the side of a wearer or a front surface of the lens, situated on the side of an object looked at by the wearer, or optionally an internal surface. In the latter case, the strip is then further protected from the risks related to abrasion. The strip 14 is delimited by its external edge 15 and its internal edge 16. The strip 14 is closed and forms a substantially oval-shaped loop. The zone where the strip 14 is situated lies at the periphery of the ophthalmic lens 45. The external edge 15 of the strip 14 is situated in proximity to the edge 46 of the lens 45. By way of example, the distance between external edge 15 of the strip and the edge 46 of the lens is between 0.5 and 5 mm.

According to one embodiment, corresponding for example to any one of FIGS. 2 to 4, at least one wire 3 is linked to at least one point of the ophthalmic lens so as to form an equipotential line.

According to one embodiment, corresponding for example to any one of FIGS. 2 to 4, the strip respectively denoted 12, 13, 14 and comprising a plurality of electronic components offers an antenna function; it is thus possible to transmit and/or to receive signals associated with data, for example by virtue of the communication technologies called Bluetooth or Sigfox. Such a device may make it possible to manage and/or to parametrize one or more electro-controlled functionality or functionalities associated with the ophthalmic lens.

According to one embodiment, corresponding for example to any one of FIGS. 2 to 4, electronic components of the strip respectively denoted 12, 13, 14 communicate with one another by power-line communication. According to one embodiment, a component forming a communication bus supplies the whole assembly; it is thus possible to limit to two the number of wires (also called "tracks") linking the electronic components of the strip.

According to another embodiment, the strip comprises two wires (tracks) for power supply and at least one independent wire (track) for communication between the electronic components. According to one embodiment, an I2C bus and two wires for communication between the electronic components are used.

The ophthalmic devices represented in FIGS. 2 to 4 can be arranged in an ophthalmic apparatus comprising in particular a frame and one of these ophthalmic devices. According to one embodiment, the strip denoted 12, 13, 14 comprising a plurality of electronic components, represented respectively in FIGS. 2 to 4, is in part or entirely masked by a part by the frame. Routinely, the frame comprises two rims which surround at least partially and help to hold an ophthalmic lens in each of the rims of the frame.

The ophthalmic lenses of the ophthalmic device of the present invention, for example the ophthalmic lenses 25 and 45, can be of various natures. They can comprise one or more electro-controlled functionality or functionalities corresponding to the lenses of types stated hereinafter:
  electro-controlled ophthalmic lens with phase variation, such as for example with electro-controlled variable index, with variable shape by virtue of a fluidic device;
  electro-controlled ophthalmic lens with amplitude variation, such as for example with electro-controlled transmission, with colorimetric variation by virtue of an electrochromic material, with tint variation by virtue of liquid crystals ("LCD" for "liquid crystal display"), with active polarization;
  electro-controlled lens to drive a function independent of phase variation and of amplitude variation, such as for example lighting integrated into the lens (for example to allow a luminotherapy), a device for heating the lens (so as to produce an anti-misting effect or in order to produce a rapid photochromic device).

The plurality of electronic components arranged in the form of at least one strip can be fitted into place according to several processes.

According to one process, use is made of techniques of depositions performed directly in the desired zone of the ophthalmic lens, for example by using plastronics techniques, in particular to deposit a support and/or wires (tracks) and the electronic components can be deposited on said support, or micro or nano-lithography techniques.

According to another process, a bendable support is used on which wires (tracks) and electronic components are deposited to form a flexible strip; a strip which can be manipulated and arranged in the desired zone of the ophthalmic lens is thus formed. It should be noted that a strip thus produced can be advantageously arranged on a whole variety of ophthalmic lenses by virtue of the possibility of readily shaping such a strip.

It is possible to arrange such a strip on an edged ophthalmic lens, starting from an unedged ophthalmic lens, according to a contour in such a way as to allow assemblage with a given frame.

It is also possible to arrange such a strip on an unedged ophthalmic lens, and then to undertake the edging of the unedged ophthalmic lens so as to produce an edged ophthalmic lens, intended to be mounted in a given frame, undertaking the edging in such a way that the electronic components are arranged in the form of a strip at the periphery of said edged ophthalmic lens.

It is also possible to arrange such a strip on a semi-finished ophthalmic lens product, and then to undertake the machining of a desired unedged ophthalmic lens and thereafter to undertake the edging of the unedged ophthalmic lens so as to produce an edged ophthalmic lens, intended to be mounted in a given frame, undertaking the edging in such a way that the electronic components are arranged in the form of a strip at the periphery of said edged ophthalmic lens.

In one embodiment, the semi-finished product is for example a lens one of the surfaces of which is optically usable (finished surface) while the opposite surface must be modified, by surfacing, so as to provide the wearer with the necessary optical correction.

In this case, the position of the shape to be edged in the semi-finished product is determined beforehand, in such a way that the strip is situated on the contour of the edged ophthalmic lens. It is for example possible to translate and/or pivot the shape to be edged so as to position this shape with respect to the strip. Preferentially, the shape to be edged is positioned in such a way that the strip is situated as close as possible to the contour of the shape to be edged, over the largest part of its length, and by ensuring that the strip is always wholly contained in the shape to be edged. It is possible thereafter, knowing the position of the shape to be edged in the semi-finished product, to surface the non-optical face of the semi-finished product to provide the wearer with optical correction, and then edge the semi-finished product according to the position of the edged shape determined beforehand so as to obtain the edged ophthalmic lens.

It is then possible, on the basis of one and the same semi-finished product, to produce various shapes of edged ophthalmic lenses for which the strip is situated at the periphery of the lens.

Quite obviously, the invention is not limited to the embodiments previously described and provided solely by way of example. It encompasses diverse modifications, alternative forms and other variants that may be envisaged by the person skilled in the art within the framework of the present invention and in particular all combinations of the various modes of operation previously described, which may be taken separately or in association.

The invention claimed is:

1. An ophthalmic device comprising:
   an ophthalmic spectacle lens comprising two main surfaces and an edge linking the two main surfaces; and
   a plurality of electronic components arranged on a support forming a strip deposited in contact with and at a periphery on at least one of the main surfaces of the ophthalmic lens or on the edge of the ophthalmic lens, the plurality of electronic components being masked by a part of a frame configured to receive the ophthalmic device.

2. The ophthalmic device as claimed in claim 1, wherein the edge of the ophthalmic lens comprises a groove in which the electronic components arranged in the form of a strip are disposed.

3. The ophthalmic device as claimed in claim 1, wherein the length of the strip is greater than or equal to 10 times the width of the strip.

4. The ophthalmic device as claimed in claim 3, wherein the length of the strip is greater than or equal to 50 times the width of the strip.

5. The ophthalmic device as claimed in claim 1, wherein the ophthalmic lens has an electro-controlled functionality activatable in part or entirely by at least one of the electronic components arranged in the form of a strip.

6. The ophthalmic device as claimed in claim 1, wherein the ophthalmic lens is an ophthalmic lens with phase variation and/or an ophthalmic lens with amplitude variation and/or an ophthalmic lens comprising at least one electro-controlled layer and/or a smart ophthalmic lens.

7. The ophthalmic device as claimed in claim 6, wherein the ophthalmic lens is a lens with amplitude variation of an electrochromic ophthalmic lens, wherein the lens comprises two rigid parts linked together to form a cavity within which is arranged an electrochromic material, and wherein the plurality of electronic components arranged in the form of a strip are linked by an equipotential line to at least one of the rigid parts.

8. The ophthalmic device as claimed in claim 1, wherein the electronic components arranged in the form of at least one strip are passive components and/or active components.

9. The ophthalmic device as claimed in claim 8, wherein the electronic components arranged in the form of at least one strip are chosen from among a resistive component, a capacitive component, and/or among a diode, a radio component, an imaging device, a battery, a sensor, a motor.

10. The ophthalmic device as claimed in claim 1, wherein the electronic components arranged in the form of at least one strip are linked together by at least one conducting wire and/or a conducting track configured to simultaneously convey electrical power and at least one signal relating to a piece of data.

11. The ophthalmic device as claimed in claim 1, wherein the electronic components arranged in the form of a strip are deposited directly in contact with the ophthalmic lens.

12. An ophthalmic apparatus comprising at least one frame and at least one ophthalmic device as claimed in claim 1.

13. The ophthalmic apparatus as claimed in claim 12, wherein at least one strip comprising a plurality of electronic components is masked by a part of the frame.

14. An ophthalmic apparatus comprising:
   at least one frame; and
   at least one ophthalmic device, which comprises an ophthalmic spectacle lens and a plurality of electronic components arranged in a form of at least one strip in contact with and at a periphery of the ophthalmic lens,
   wherein the electronic components arranged in the form of a strip are arranged on a support forming a strip and the support is deposited in contact with the ophthalmic lens, and wherein a part or the totality of the electronic components is masked by the frame.

15. A method for producing an ophthalmic device including an ophthalmic spectacle lens and a plurality of electronic components arranged in a form of at least one strip in contact with and at a periphery of the ophthalmic lens, the method comprising:
   providing an unedged ophthalmic lens;
   providing an edging contour for the ophthalmic lens;
   providing a flexible strip comprising electronic components arranged on a support;
   cutting the ophthalmic lens according to the edging contour to produce an edged ophthalmic lens;
   fixing the flexible strip at the periphery of the edged ophthalmic lens.

16. A method for producing an ophthalmic apparatus which includes at least one frame and at least one ophthalmic device, which includes an ophthalmic spectacle lens and a plurality of electronic components arranged in a form of at least one flexible strip in contact with and at a periphery of the ophthalmic lens, the method comprising:
   providing at least one flexible strip;
   arranging the electronic components on the flexible strip;
   providing at least one unedged ophthalmic lens;
   providing at least one edging contour for the ophthalmic lens;
   cutting at least the ophthalmic lens according to the edging contour to produce an edged ophthalmic lens;
   fixing the flexible strip with the electronic components at a periphery of the edged ophthalmic lens;
   fitting into place in the frame of the ophthalmic device comprising the edged ophthalmic lens and the flexible strip with the electronic components, such that a plurality of electronic components is in part or entirely masked by a part by the frame.

* * * * *